(12) United States Patent
Lipsey et al.

(10) Patent No.: US 8,662,669 B2
(45) Date of Patent: Mar. 4, 2014

(54) VISION ENHANCEMENT DEVICES FOR NIGHTTIME DRIVING AND METHODS OF USING SAME

(76) Inventors: Jonathan Edmund Lipsey, McLean, VA (US); Alexander Morgan Rizik, Washington, DC (US)

(*) Notice: Subject to any disclaimer, the term of this patent is extended or adjusted under 35 U.S.C. 154(b) by 297 days.

(21) Appl. No.: 12/926,025

(22) Filed: Oct. 21, 2010

(65) Prior Publication Data

US 2012/0099078 A1     Apr. 26, 2012

(51) Int. Cl.
*A61B 3/10* (2006.01)
*A61B 3/00* (2006.01)

(52) U.S. Cl.
USPC ............................................. 351/221; 351/246

(58) Field of Classification Search
USPC ...................... 351/200–246; 348/149; 353/85
See application file for complete search history.

(56) References Cited

U.S. PATENT DOCUMENTS

| | | | | |
|---|---|---|---|---|
| 5,563,670 A | * | 10/1996 | Tenmyo | 396/373 |
| 6,033,076 A | * | 3/2000 | Braeuning et al. | 351/224 |
| 6,916,096 B2 | * | 7/2005 | Eberl et al. | 351/209 |
| 2005/0100191 A1 | * | 5/2005 | Harbach et al. | 382/103 |
| 2007/0171386 A1 | * | 7/2007 | Cheng et al. | 353/85 |
| 2012/0127313 A1 | * | 5/2012 | Ehlgen | 348/149 |

* cited by examiner

*Primary Examiner* — Mohammed Hasan

(57) ABSTRACT

The devices and methods of the invention ameliorate age-related losses of night time visual acuity by constricting the pupil with a directionally focused, low-power light source close to the eye that does not impair vision by reflecting off the internal glass surfaces of the windshield and windows. Preferred devices and methods include means for adjusting the brightness of the light source and the distance and angular orientation between the light source and the eye. Particularly preferred devices and methods provide means to fix the light source in relation to the eye so that effectiveness is not diminished when the driver turns his or her head.

1 Claim, 5 Drawing Sheets

VISION ENHANCEMENT DEVICES FOR NIGHTTIME DRIVING AND METHODS OF USING SAME

BACKGROUND AND OBJECTS OF THE INVENTION

Field of the Invention

Age related night vision problems make it difficult for people who drive at night for a living, such as truck drivers and public safety officers, to continue to perform their jobs safely. The objective of this invention is to provide simple, safe, and economical devices, and methods of using them, to ameliorate the symptoms of age-related night vision problems, thereby extending the useful careers of people that drive at night for a living. The devices and methods of the invention ameliorate age-related losses of night time visual acuity by constricting the pupil with a directionally focused, low-power light source close to the eye that does not impair vision by reflecting off the internal glass surfaces of the windshield and windows. Preferred devices and methods include means for adjusting the brightness of the light source and the distance and angular orientation between the light source and the eye. Particularly preferred devices and methods provide means to fix the light source in relation to the eye so that effectiveness is not diminished when the driver turns his or her head.

"Visual acuity and contrast sensitivity decline with age. The decline generally begins slowly after the age of 40 followed by an accelerated decline after age 60," making night driving a significant problem for older people. (www.nlm.nih.gov). The risk of a fatality at night is 2.3 times greater than it is during the day (Federal Highway Administration). In general, as people age, frequently as early as their mid-forties, their vision is diminished, even more so at night. Age related night vision problems make it difficult for people who drive at night for a living to continue to safely perform in their jobs. Truck drivers, taxi drivers, police officers, ambulance drivers, firefighters, and other public safety officers not only must regularly drive at night, but also must be able to see exceptionally well at night because their jobs may require them to drive quickly in emergency situations. The inability to drive safely at night may force such people to quit their chosen profession before they are either economically or psychologically ready to retire. This is a form of "physiological" age discrimination.

Although being able to see objects on dark rural roads is necessary, it is more frequently necessary, and thus more important, to be able to read lighted street signs and identify other vehicles on the road while driving in the city or on major roads, such as interstate highways. Older people often find themselves unable to read road signs at night even when those signs are illuminated by headlights or fixed lamps. They experience a lack of visual acuity (i.e. the characters on the signs appear blurred). Other illuminated features, such as traffic lights, lane dividers, and tail lights also become blurred. This can make it difficult to determine the type of vehicle (car, motorcycle, truck, etc.) in front of the driver and the distance from the vehicle. Age related night vision problems will increase as the population ages. By the year 2020, it is anticipated that 17 percent of the United States population will be 65 or older, resulting in more than 50 million eligible older drivers. (Federal Highway Safety Administration)

There have been a variety of proposals to aid night driving. However, these are typically limited to anti-glare devices. Such devices have proven effective in reducing glare from headlights, but do not address the problem of decreased visual acuity at night.

There have also been proposed illumination devices to constrict the pupil to address vision problems other than age-related loss of night vision. These have proven unsatisfactory for purposes of the present invention. U.S. Pat. No. 7,455,408, for example, describes a device for reducing visual aberrations associated with scars on the cornea by constricting the pupil so that the scar is no longer in the field of view. The proposal is not directed to the fundamentally different problems associated with driving at night. Moreover, this patent discloses illumination devices mounted on, for example, eyeglass frames. The present inventors have found that this proposed method is impractical for use in increasing visual acuity while driving at night. Eyeglass frames are so close to the eye that they do not allow the light from a light source mounted thereon to be aimed directly into the pupil. The eyeglass frames also cannot readily support the circuitry needed to have an adjustable light intensity.

SUMMARY OF THE INVENTION

This invention helps ameliorate the problem of age related loss of visual acuity while driving at night. A low-power, directionally focused light source is provided to direct light into the eye, causing the pupil to constrict. Light entering the constricted pupil is better focused on the retina, much as a constricted aperture is used to focus light on the film in a pinhole camera.

DETAILED DESCRIPTION OF THE INVENTION

Figure 1A:
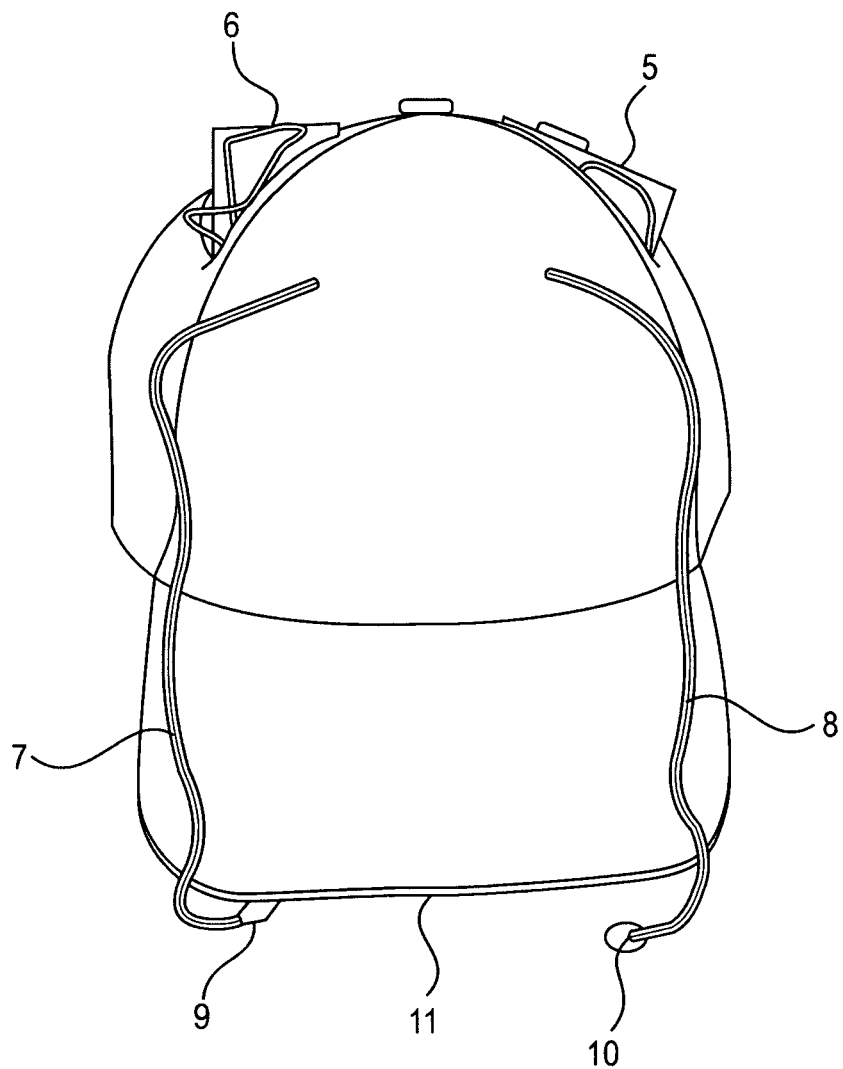
FIGS. 1A and 1B illustrate an embodiment of the invention wherein LEDs were attached to the brim of a baseball cap.

An understanding of age related night vision problems requires familiarity with how the human eye works and the impact of aging on vision. There are four major parts of the human eye that account for vision: the cornea, the lens, the pupil, and the retina. As light from another object enters the eye, it first passes through the cornea, which slightly bends the light waves, bringing them more into focus. The light waves then enter the eye through the pupil, a hole in the eye located just behind the cornea. The light waves are then bent further and focused by the crystalline lens, which is situated behind the iris, the colored part of the eye that surrounds the pupil. After being manipulated by the lens, the light is received by the retina, which senses the presence of light and is responsible for sending the signal to the brain.

The pupil "modifies the amount of light entering the eye, thus permitting useful vision over a wide range of luminance levels," (Davson, H., *Physiology of the Eye, at* 755). The pupil contracts in the presence of light and expands in the absence of light. The iris, the colored muscle that surrounds the pupil, is responsible for the expansion and contraction of the pupil. The diameter of the pupil, d in mm, is related to the luminance, B in mL [millilamberts], by the empirical equation: $\log d = 0.8558 - 0.000401(\log B + 8.1)^3$, (Davson, H., at 757). The maximum diameter of the pupil is 6.6 mm to 7.6 mm (id.). The minimum pupil diameter is about 3.5 mm, leaving a maximum pupil constriction attainable by exposure to natural or artificial light of about 3 mm. When light shines on one eye, the resulting constriction of the pupil is the direct light reflex. Surprisingly, the pupil in the other eye also constricts even when it is not directly exposed to light. This is called the consensual light reflex. Thus, operation of the present invention is not restricted to illumination of both pupils. Direction of a low-power, directionally focused beam of light into the pupil of one eye has been found effective in improving visual acuity in both eyes.

The pupillary response is dependent not only on the intensity of the light, but also on its wavelength. The pupil is most sensitive to light with a wavelength of 540 nm, yellow-green light, and least sensitive to red light, which has a wavelength of 685 nm. Thus, it is preferred in the present invention to use a light source emitting light in the yellow-green wavelengths in order to minimize the amount of stray ambient light generated inside the vehicle.

There are two different types of light sensitive cells on the retina: cones, and rods. The cones see in color and are located mainly in the center of the retina on the back of the eye. This area, that is predominantly occupied by cones, is called the fovea centralis and is responsible for the strongest perception of color and for the crispest vision. The rods, located principally on the periphery of the retina, see only in black and white. The rods are responsible for peripheral vision. There are, however, cones dispersed among the outer parts of the retina, such that some color can be detected in peripheral vision. (http://www.tedmontgomery.com/the_eye/.) Thus, the present invention is principally concerned with preserving crisp color vision associated with central regions of the retina, whereby perception of traffic signals, tail lights, and lighted signs is improved at night.

It is a well known fact that as people age, their eyesight diminishes. Older people often find themselves unable to focus properly on objects and those objects appear blurry. This is a result of presbyopia, a condition where the crystalline lens of the eye loses its flexibility (Am. Optometric Assoc.). Presbyopia usually becomes noticeable to people in their 40s or 50s. As well as losing flexibility, the lens also becomes increasingly dense and more yellow with age. This decreases contrast sensitivity, which can make it "difficult to tell where an object ends and its background begins, making it difficult to see curbs or steps, for example" (Lighthouse) (http://www.lighthouse.org/medical/the-aging-eye/), (http://www.aoa.org/x4697.xml).

The conditions of night driving are difficult to cope with even if a person has perfect vision. Any preexisting vision problems are exacerbated under these difficult conditions. Joanne Wood, Mark Woolf, and Justin and Alfred Owens conducted a study in which they tested drivers' visual acuity and contrast sensitivity under different driving conditions. They found that "visibility is seriously degraded during night driving and that, especially with pedestrians, the problem is greater for older drivers" (Wood). Moreover, "by the time you turn 60 . . . the lens becomes yellowed, less flexible, and slightly cloudy. The fat pads surrounding the eye decrease and the eye sinks back into the socket." (http://www.nlm.nih.gov/medlineplus/ency/article/004013.htm). Further, as you age "the sharpness of your vision (visual acuity) may gradually decline." (Id.) The combination of these effects makes night driving a significant problem for older people, and, therefore, a significant disability for those whose employment requires night time driving.

DESCRIPTION OF THE PREFERRED EMBODIMENTS

The present invention is believed to function on principles similar to those involved in operation of a pinhole camera. A pinhole camera has no lens. It focuses the light by having it pass through a very small aperture. Only a small beam of light from each point on the object enters the camera, thereby focusing the image. The result is an inverted image on the back of the camera, just as the image is focused and inverted on the human retina.

When the pinhole aperture is large, the image is unfocused. Diffraction is minimal, but "each point on the object will be projected as a finite circular patch of light on the film." ((Britannica). http://www.britannica.com/EBchecked/topic/430511/optics/37939/Historical-background.) When the aperture is very small, the image is also unfocused. Although the patch of light on the film from each point is small, diffraction is great (id.). Thus, an optimal small aperture size balances these effects and produces a focused image. (Id.)

In the eye, the lens focuses the light. However, as stated previously, in older people, the lens loses some of its flexibility and ability to focus light. Thus, the light needs to be focused some other way, or else visual acuity is greatly diminished, particularly at night when the pupil is large.

The solution to this problem provided by this invention is somewhat counterintuitive. Conventional wisdom dictates that dilated pupils are needed in low light conditions to increase the amount of light striking the retina. This conventional wisdom strongly contraindicates the idea that night vision can be improved by slightly reducing pupil size at night, thereby better focusing the light on the retina by the pinhole camera effect.

The solution provided by the present invention is also contraindicated by the conventional wisdom that a light should not be on inside a car while driving at night. The light can reflect off of the inside of the windshield and windows, making it difficult or impossible to see at night. A light in the car is distracting to the driver, which makes night-driving conditions even more hazardous. The present invention avoids this problem by (1) mounting the light source close to the eye, (2) using a directionally focused rather than diffuse light source, and (3) directing the light to the extent practical directly into the pupil of one or both of the operator's eyes. These features combine to maximize the constrictive effect on the pupil while minimizing the amount of ambient light generated inside the car, whereby the light does not illuminate the reflective surfaces inside of the vehicle.

The Light Source

The inventors have discovered that the obvious light sources are unsatisfactory for purposes of the invention. The unmodified incandescent flashlight bulb is unusable for two reasons. First, it emits a diffuse rather than focused beam of light. Second, it generates a significant amount of heat, making mounting near the eye both difficult and potentially dangerous. The inventors' have discovered two particularly preferred ways to safely direct a low-power, directionally focused beam of light into the driver's eye. These are the use of a relatively low-power light-emitting diode (LED) mounted in close proximity to the eye or, alternatively, the use of fiber optic cables to carry remotely generated light to and then direct it into the eye.

LEDs that can be used to vary the dilation of the pupil come in different wavelengths (colors). The light from an LED is very directional. Unlike a light bulb that shines in all directions, the light from an LED is primarily focused in a 30° cone in front of the LED. The angle of the light source, as well as the distance from the light source to the eye, impacts the dilation of the pupil. Unless the LED is pointed almost directly into the eye, the light does not have a significant effect on the pupil. According to the "inverse square law," light intensity drops off with the square of the distance from the light source. The closer the light source is to the eye, the more the light will illuminate the eye, and thus the more the pupil will constrict. Therefore, if using an LED, the light must be relatively close to the eye to minimize the amount of light directed at the face and non-responsive structures of the eye.

Fiber optic fibers do not themselves generate light. They merely internally reflect the light so it travels from one end of the fibers to the other with no light showing in between the two ends. There are many benefits to using fiber optic cables in the present invention. First, the light source (LED or light bulb) can be located well away from the eye and light transmitted to the eye through the fiber optic cable. Fiber optic cables are also more malleable than LEDs, and can thus be bent and pointed directly into the eye. Fiber optic cables are also sturdier and malfunction less frequently. However, fiber optic cables do not fully retain their shape once bent and are hard to manipulate through sharp turns.

The Power Source

The light beam must be generated by a suitable source of electrical power. While use of the car's electrical system as the power source is feasible, it requires a wired connection to the light source. This is not particularly desirable if the light source is mounted on or attached to the driver's head. Thus, it is particularly preferred to use a battery as a self-contained and portable power source. Use of LEDs powered by 3-volt coin-style, lithium batteries is particularly preferred, as the power supply is easily mounted on or near the location of the LED even when located on the operator's head. Traditional incandescent light sources powered by traditional alkaline batteries can be used to remotely illuminate fiber optic cables.

Variation of Light Intensity

The inventors have found it desirable for the operator to be able to vary the intensity of the light beam entering the eye. The optimal intensity has been found to vary with ambient conditions and the nature of the highway being travelled. On well lit roadways, an unnecessarily intense light beam directed into the eye can be distracting. In preferred embodiments of the invention, means to vary the intensity of the light and to turn it off entirely are provided. In particularly preferred embodiments, a potentiometer with a built in on-off switch wired in series between the power source and the source of illumination is preferred. A 10 K ohm potentiometer has proven satisfactory when used with 9v alkaline or 3v lithium batteries and appropriately rated LEDs for remote or local light generation, respectively.

Variation of the Wavelength of Light

As noted previously, the optimal light for constricting the pupil has a wavelength of about 540 nm. This yellow-green light may be distracting to some drivers. Tests have revealed in some cases a subjective preference for white light, perhaps because it is more common and familiar and thus less distracting. The invention is operable with other wavelengths of light, although red light is particularly inefficient in constricting the pupil and is thus not preferred. Techniques known to persons skilled in the art are available for employing LEDs capable of emitting different wavelengths of light in a selectable fashion, such as by combining different colored LEDs with a selection switch to allow the driver to select the most preferred wavelength of light to be generated either near the eye or, in the case of fiber optic devices, remotely.

Varying the Distance and Angular Relation Between the Light Source and the Eye

A significant aspect of the present invention was recognition of the importance of the spatial orientation of the light source to the pupil in achieving the desired increased visual acuity with minimal distraction and minimal unwanted interior glare. As noted above, simply providing a source of illumination inside the car creates all the reflective distractions that have led generations of drivers to be counseled not to drive at night with an interior light on. Simply mounting a diffuse light source near the eye presents the same problem because the vast bulk of the emitted light will be directed somewhere other than into the eye.

Surprisingly, problems arise in use of even a directionally focused light source, like an LED, if it is mounted too near the eye, as on the frame of a pair of eyeglasses. Such devices do not permit the light beam to be directed substantially into the pupil because the angle between the light beam and the eye is too severe.

When using LEDs, for example, it has been found that they should be mounted at distance of from 1 to 6 inches, preferably, 2 to 5 inches, most preferably 3 to 4 inches, in front of the eye and offset from the central axis of the eye so as to appear in the periphery of the driver's field of view.

The device performs optimally when the directional light source shines directly at the pupillary opening from a minimum distance away from it, thereby maximizing the constrictive effect while minimizing the amount of stray light released into the vehicle. This will, of course, vary in minor respects from driver to driver. Accordingly the device is preferably mounted so as to be adjustably aimable by the driver to obtain these desired effects. The means necessary to do so will vary with the nature of the light source and the location of its mounting.

For LEDs mounted by suitable means on the driver's head, as by mounting on the underside of a visor or hat brim, the use of suitably heavy lead wires connected to the LEDs will allow them to be aimed simply by bending the lead wires to obtain the desired directional orientation. The wires must be sufficiently flexible to permit bending but sufficiently rigid to remain in the oriented position during normal use. For devices mounted to fixed structures in the vehicle, such as the top side of the vehicle visor, it is desirable to extend the point of illumination into the preferred zone described above. This is conveniently done, for example, with a fiber optic cable to carry light generated in a closed container mounted, for example, on the vehicle visor, to a point nearer the driver's eye. As noted above, however, fiber optic cables, while malleable, do not reliably retain a bent conformation. This problem can be solved by including inside the fiber optic bundle a suitably gauged metal wire, somewhat heavier than that described above, to permit aiming of the light emitted from the end of the bundle by bending the fiber optic cable while causing the cable to retain its bent configuration.

EXAMPLES

Example 1

Hat-Brim Mounted LEDs

Figure 1B:
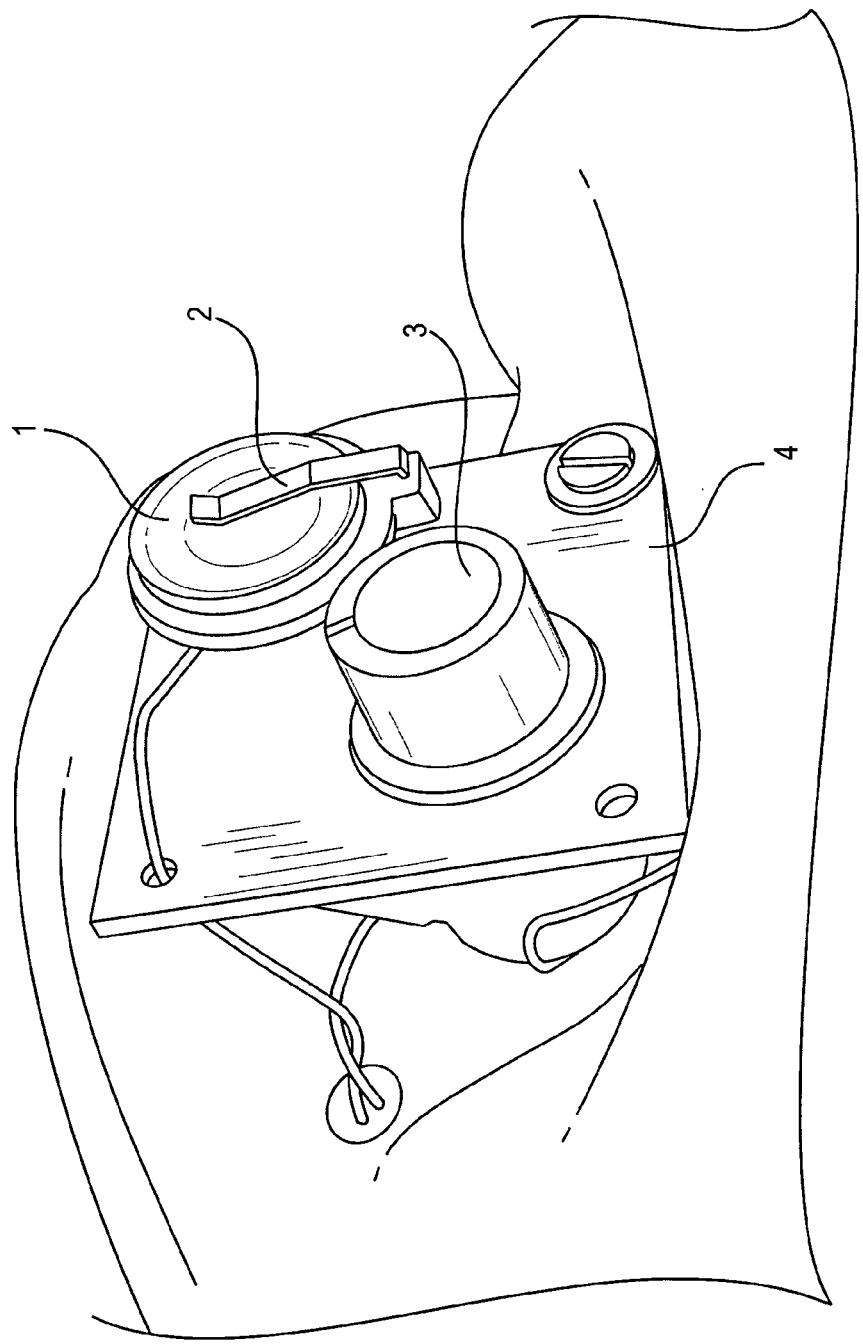

LEDs were attached to the brim of a baseball cap, as shown in FIGS. 1A and 1B. A three volt, coin-style lithium battery a1, battery holder 21, and combination on-off switch and potentiometer (which allows the user to adjust the intensity of the light delivered) (3) mounted on a small printed circuit board (4) were affixed to each side of the cap (5, 6). Eighteen gauge copper wires (7, 8) were used to connect the right and left LEDs (9, 10) to the right and left adjustable power sources, respectively, and the wires were attached to the LEDs by soldering. The wires and attached LEDs were routed over the top of the cap brim (11) and affixed thereto at spaced apart locations on the front edge of the brim by suitable fastening means, such as glue or staples. The wires extended over the front edge of the cap brim and were bent backward over the front of the brim so that the LEDs were directed toward the driver's right and left eye, respectively. The flexibility of the copper wire allows the LEDs to be bent and oriented so that they point directly into the eyes. The wire was also rigid enough to retain its shape once bent.

This format provided maximum versatility. One or two lights can be directed into the left or right eye, the brightness of the lights can be easily and individually adjusted, and the LEDs can be aimed very easily.

This device also illustrates the desirability of mounting the directional light source on the driver's head. When so mounted, the benefit of the device was not lost when the driver turned his or her head.

Example 2

Fixed Fiber Optic Device

Figure 2:
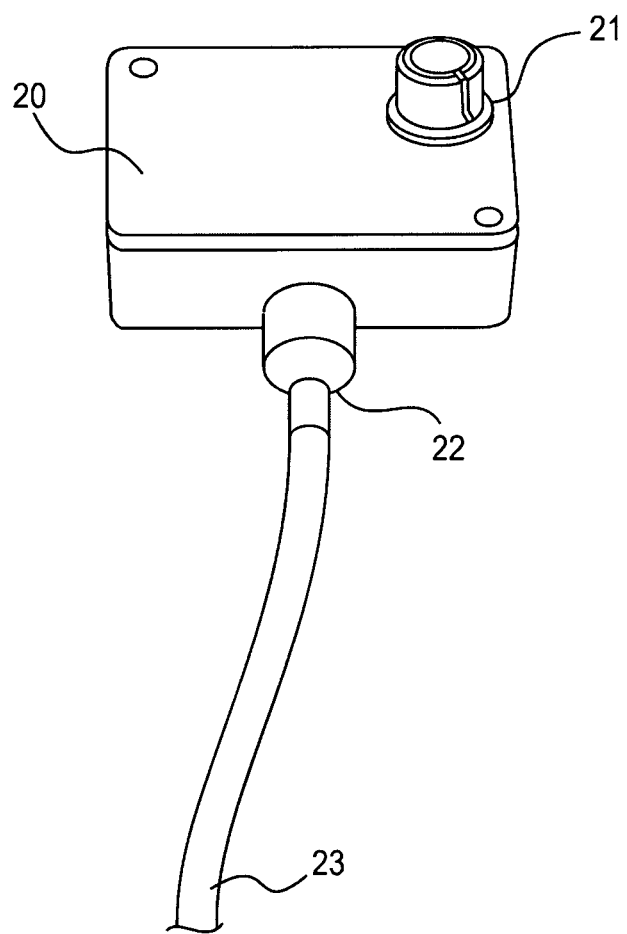
FIG. 2 illustrates a combined light source and fiber optic device.

A combined light source and fiber optic device were attached to the upper surface of the driver's side vehicle visor. The light source, as shown in FIG. 2, consisted of a closed, opaque plastic box (20) containing a 9v alkaline battery wired in series with a 10 K ohm potentiometer with built-in on/off switch (21) and a suitably rated LED, thereby allowing a variable intensity light to be generated in the closed container. One end of the fiber optic cable (22) terminated inside the light box and the other end (23) served to direct the variable intensity light toward the driver's eye. The cable was approximately 8 inches long and consisted of fiber optic fibers bundled together with a 12-gauge copper wire so the cable could retain its shape upon bending. The illuminating end of the cable was aimed toward the driver's left eye. This construction was effective but suffered a number of drawbacks. The distance from the end of the fiber optic cable to the eye required greater light intensity. However, its position, in the upper left corner of the driver's field of view, is the least distracting. A driver rarely has to look to the upper left. With this embodiment, there is relative motion between the driver's eye and the device. The light source vibrates with the motion of the vehicle and does not move as the driver's head moves.

Example 3

Fiber Optic Fibers Attached to Goggles

Figure 3A:
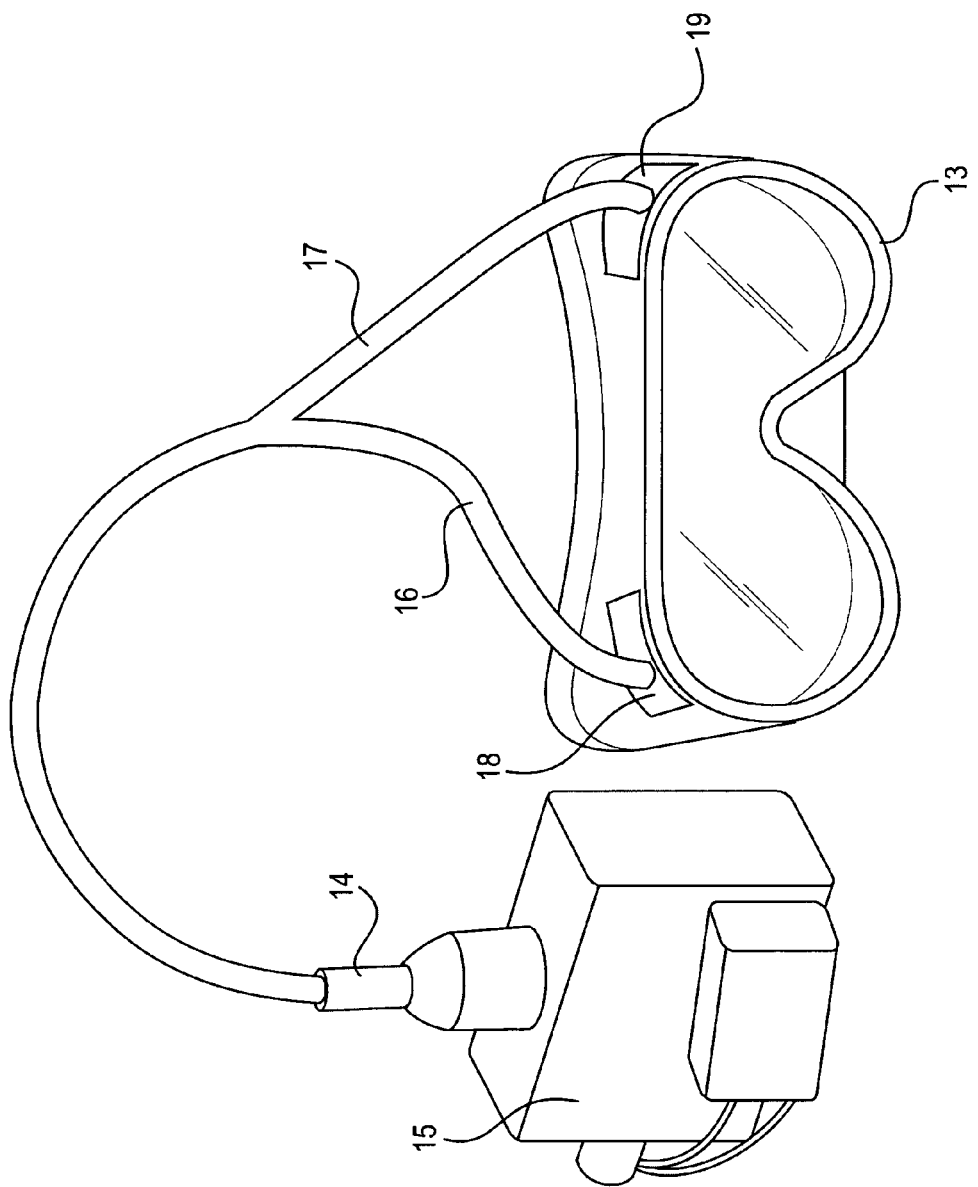
FIGS. 3A and 3B illustrate an embodiment of the invention employing fiber optic cables attached to a lenseless goggles frame.
Figure 3B:
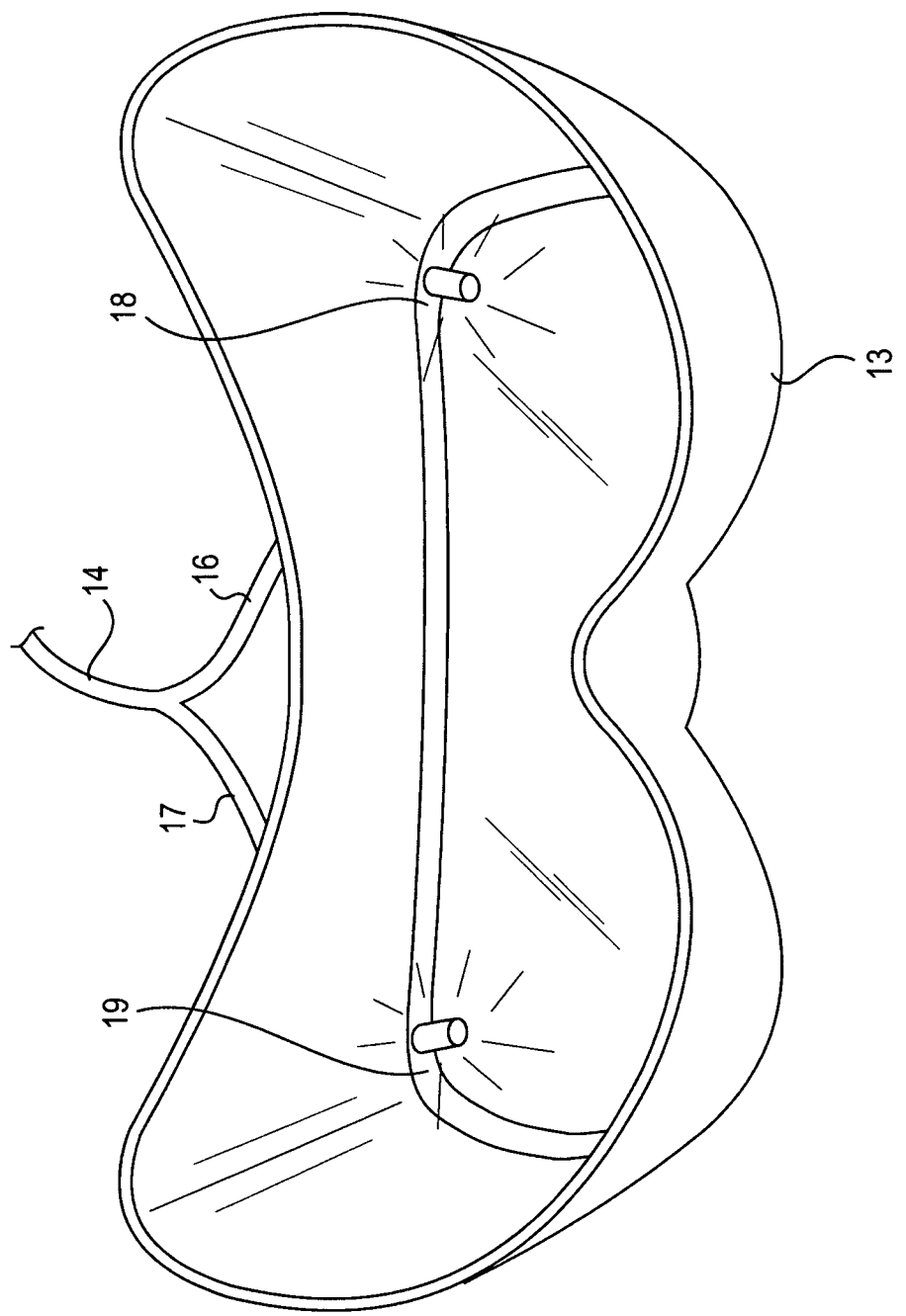

In an effort to avoid the problem associated with light sources mounted on eyeglass frames, a third embodiment of the invention used the frame from a pair of safety goggles (13) with the plastic lens removed, as shown in FIGS. 3A and 3B. It was hoped that the relatively elongated sides of the safety goggles would position the light source to enter the eye more directly. A fiber optic cable (14) emerging from an enclosed LED light source (15) as above described mounted to the side headband of the goggles was then split into two bundles (16, 17). One bundle was directed through a hole drilled in the upper right corner of the goggles (18), the other in the upper left corner (19). The bundles of fibers were taped to keep them secure within the mounting holes. This embodiment is less distracting to the driver because the light source is very close to the eye and not in the direct line of sight; the lights are seen principally with peripheral vision. The brightness of the lights can be adjusted in the same way as the previous embodiment. However, this embodiment does not allow for facile aiming of the light beams. An alternative embodiment was also constructed in which the individual fibers were spread out across and through the upper edge of the frame, not bundled in the corners.

Example 4

Testing

A test laboratory was constructed to test the devices. The test laboratory was a converted workroom in a darkened basement approximately 40 feet by 20 feet.

A situation was created to mirror that of night driving conditions. A license plate was hung at about eye level in front of a black sheet at one end, with a chair for the test subject at the other end, 35 feet away. A flashlight was mounted in a fixed position four feet from the license plate and slightly below it, so that the light was shining up onto the plate at an angle of about 25 degrees. License plates are painted with retroreflective paint, which reflects light back to its source and is the same paint used on road signs. The flashlight simulates a headlight. The light from the flashlight is reflected off of the license plate and back to the test subject, just as light from a headlight is reflected back to a driver. The sheet reduces any reflection from objects other than the license plate.

The subject sat in a chair 35 feet from the license plate and described the relative visual clarity of the symbols on the license plate. There were six different groups of symbols of different sizes on the license plate. In decreasing size order, these were the large numbers in the middle, the state name, various smaller indications of the type of license, and the expiration date. Various light combinations were used from the light sources mounted on the goggles and the hat brim.

The subject was a 58 year old male who regularly experiences a decrease in visual acuity while driving at night. During the experiment, the subject's vision was corrected to near 20/20 with contact lenses. The subject was asked to view various parts of the license plate, and then asked subjective questions about what he saw. The scale used was "legible and crisp," "legible," "difficulty legible," and "illegible."

The subject was also asked about the feel of the cap and goggles, and the perceived usefulness of the device.

RESULTS

Brim-Mounted LED Device of Example 1

At the 35 foot distance, the large symbols were always legible and thus not good indicators of an increase or decrease in visual acuity. When no device was used, the state name was illegible, and the month and year of expiration were "colored blurs" in which no individual symbols could be distinguished. When the brim-mounted LEDs (yellow) were on full power, the state name became "legible and crisp;" the month and year were still illegible, but the subject could distinguish individual symbols. When one LED, right or left, was turned off, there was no decrease in visual acuity. The subject was then asked to decrease the light intensity slightly and adjust the position of LEDs to reduce distraction. This resulted in no loss of visual acuity. The optimal setup for increasing visual acuity while minimizing distraction was when one LED is used at an intensity slightly less than full power. Green LEDs were also tested, but these were no less distracting and did not provide as great an increase in visual acuity.

Fixed Fiber Optic Device of Example 2

The fixed device was attached with rubber bands to the left side of the driver's sun visor and was tested on the road. The 8" fiber optic cable containing the thick copper wire could be bent to direct the light toward the driver's left eye and was tested while driving at night. The device worked well to improve visual acuity for tail lights and lighted signs on interstate highways. The vibration of the light source was described as distracting and there was concern that the sharp end of the cable near the eye might cause injury in an accident or on leaving the car. Also, the light did not move with the driver's head the way it does with the brim-mounted embodiment.

Goggles Device of Example 3

The goggles with the fiber optic device were then tested. The light was a white light. When on full power, the state name was "difficulty legible." The visibility of the month and year were similar to the previous experiments. Also, the entire license plate appeared dimmer when the lights were on full power. This was likely due to the discovery of a negative effect of too much pupillary contraction. At severe contraction, the increased image clarity was counteracted by reduction of the amount of light entering the eye from the test sign. This device provides the least flexibility (no ability to aim lights or turn one off). However, the subject noted that the white lights were less distracting than the green and yellow lights previously tested. The major problem with this device was that noted for the eyeglass frame device described in the prior art: the goggle frame was so close to the face that the light could not be fully directed into the eye.

CONCLUSION

In order for any of these possible solutions to be helpful to a driver, it must meet certain form-fit-function requirements. It also must be easily portable. The amount of light used to dilate the pupil must be minimized so as not to distract the driver. If the interior of the car is illuminated too much, the reflection off of the windshield proves to be distracting to the driver and restricts the driver's view. The device must provide enough light to dilate the pupil the desired amount, while not completely destroying the driver's night vision or distracting the driver.

Given these results, the most preferred embodiment of the invention was the brim-mounted LEDs of Example 1. It provided the greatest improvement in visual acuity and also allowed for the most adjustment of the direction and intensity of the light. The length of the hat brim allowed the LEDs to shine directly into the eye and the malleability of the wire allowed the aim to be easily adjusted. As previously mentioned, the upper left corner of the driver's field of view is the place where a light would be least distracting. With this in mind, the presently most preferred embodiment of the invention is the brim-mounted LED device with white LEDs (found subjectively least distracting), with only the left LED illuminated so as to appear in the upper left hand quadrant of the operator's field of view.

With this apparatus, people whose vision suffers at night, those above the age of forty, might be able to drive at night more safely. This will be especially helpful for those whose job requires night driving, such as truck drivers, taxi drivers, police officers, firefighters and other public safety officers. It will also help those who work at night or whose work requires them to drive home in the dark. This device will allow people holding those jobs to continue working safely and comfortably at those jobs and stay independent even as they age and their eyesight is diminished. Independence of the aging is very important.

The present invention is by its nature of universal application. It is useful not only to those who need to have better visual acuity at night due to the nature of their employment, but also to anyone who wants to drive at night more safely and comfortably.

The invention is ideally used in highway driving. A highway driver must read many lighted signs, and a driver must also be able to clearly see reflective lane markings and the tail lights of cars in front of him to accurately judge distances. The invention is inexpensive, easy to manufacture, and long lasting. It is portable and small enough to be kept in the car at all times so that the driver can simply put it on or turn it on when needed.

While there has been described herein the principles of the invention, it is to be understood by those skilled in the art that this description is made only by way of example and not as a limitation to the scope of the invention. Accordingly, it is intended by the appended claims to cover all modifications of the invention which fall within the true spirit and scope of the invention.

What is claimed is:

1. A method of effecting amelioration of the effects of age-related loss of visual acuity while operating a vehicle at night consisting essentially of
   (1) generating a low temperature, low-intensity, directionally focused visible light source;
   (2) continuously directing the output of said light source substantially directly into at least one pupil of the eye of a vehicle operator in need of such amelioration;
   (3) adjusting the brightness, and directional orientation of the output of said directionally focused light source in relation to the operator's eye to effect constriction of said pupil without causing visually obstructive glare off interior glass surfaces of said vehicle; and
   (4) maintaining a fixed spatial relationship between said light source and said operator's eye regardless of movement of said operator's head by mounting such light source on said operator's head;
whereby the ability of the vehicle operator in need of such amelioration to perceive information from illuminated signage and markings, traffic lights, and tail lights from other vehicles while operating a vehicle at night is enhanced without external electronic processing of said information.

* * * * *